Aug. 3, 1948.  E. M. DIGMON  2,446,459
DEVICE FOR NIGHT FISHING
Filed Sept. 16, 1946  4 Sheets-Sheet 1
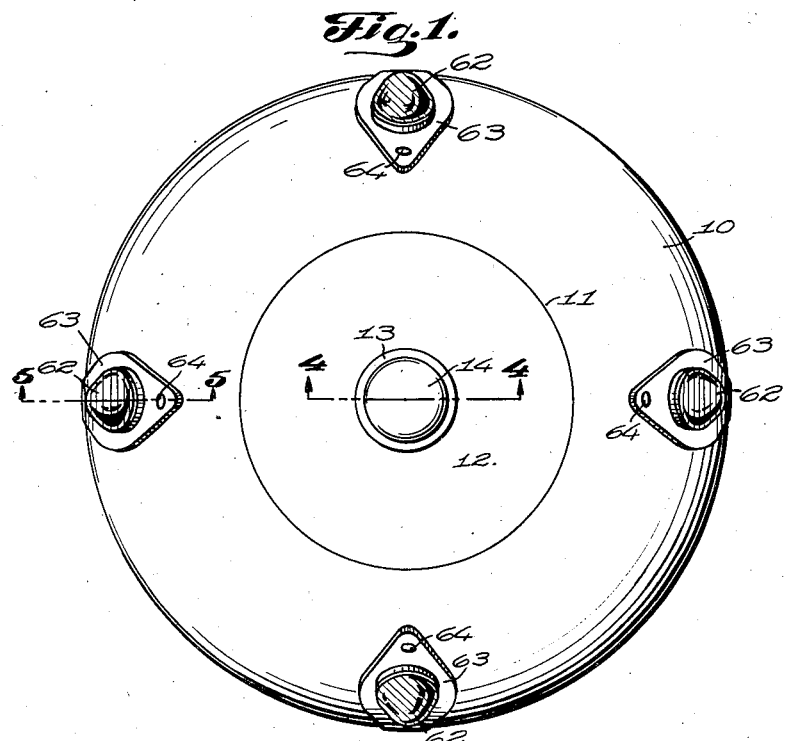
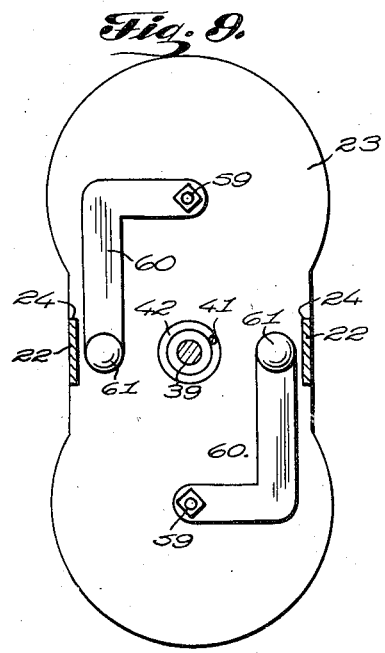
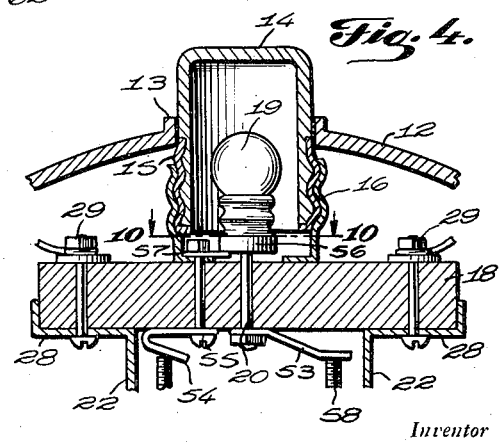
Inventor
Ed M. Digmon
By Clarence A. O'Brien
and Harvey B. Jacobson
Attorneys Aug. 3, 1948.                E. M. DIGMON                    2,446,459
                         DEVICE FOR NIGHT FISHING
Filed Sept. 16, 1946                                    4 Sheets-Sheet 2
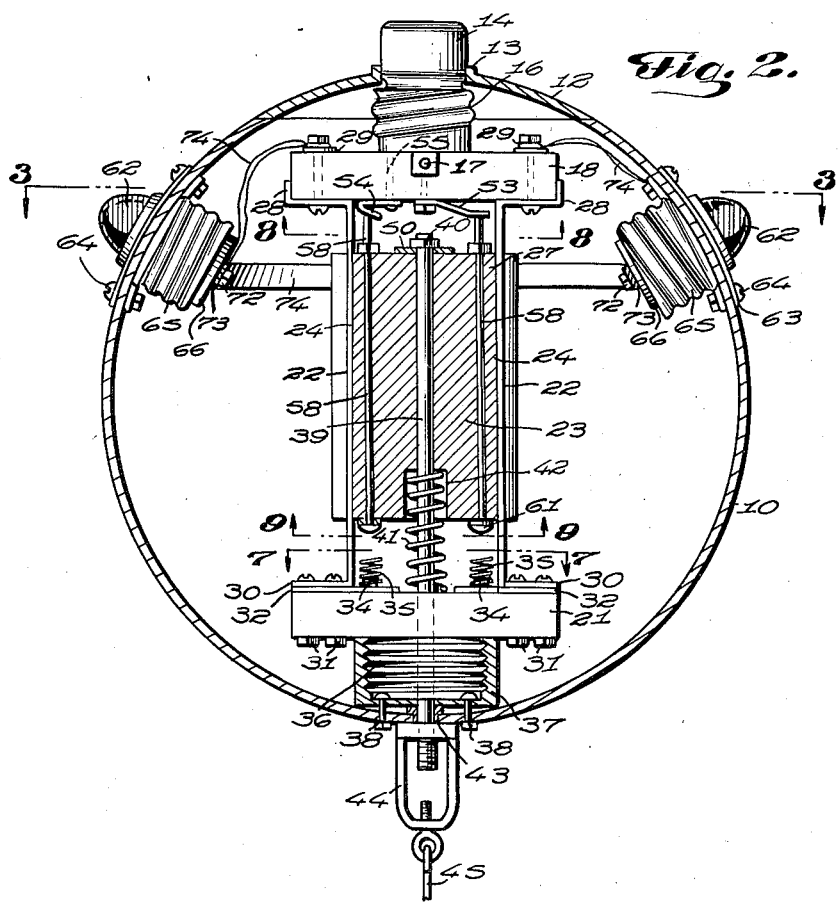
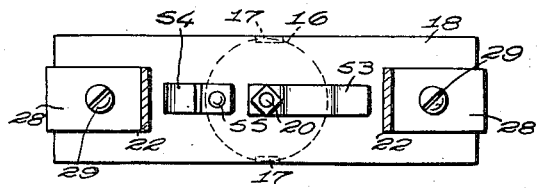
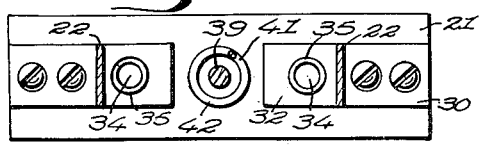
Inventor
Ed M. Digmon
By
Clarence A. O'Brien
and Harvey B. Jacobson
Attorneys Aug. 3, 1948.  E. M. DIGMON  2,446,459
DEVICE FOR NIGHT FISHING
Filed Sept. 16, 1946  4 Sheets-Sheet 3
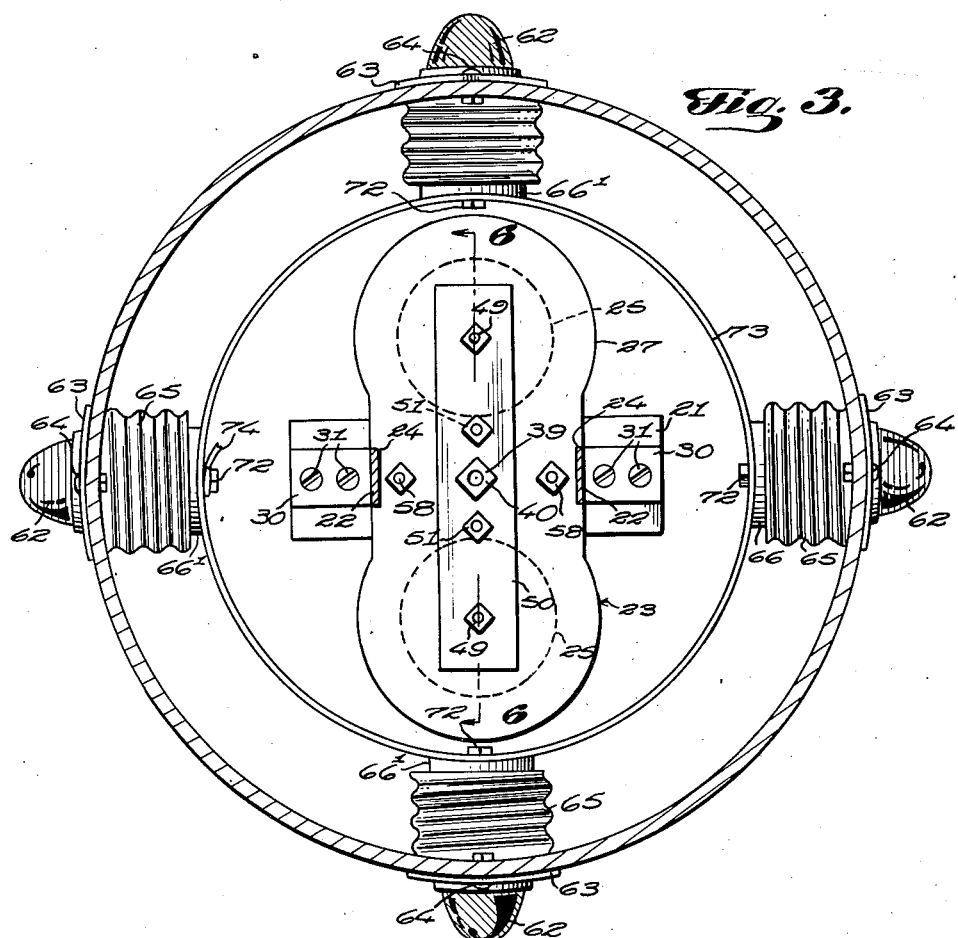
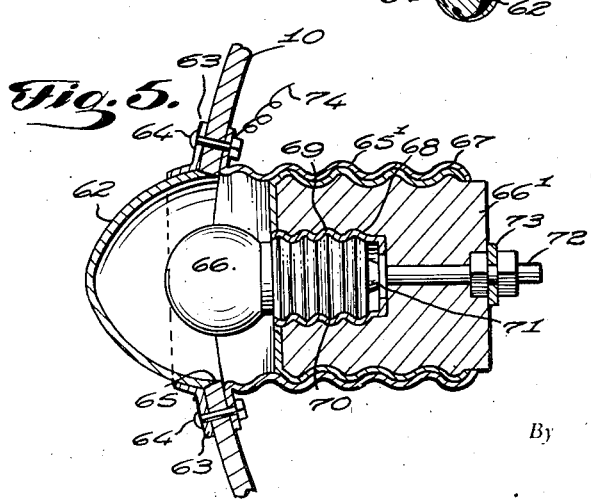
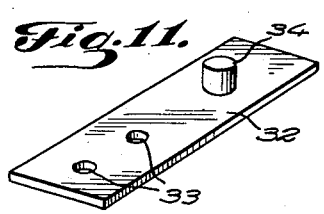
Inventor
Ed M. Digmon
By Clarence A. O'Brien
and Harvey B. Jacobson
Attorneys Aug. 3, 1948.  E. M. DIGMON  2,446,459
DEVICE FOR NIGHT FISHING
Filed Sept. 16, 1946  4 Sheets-Sheet 4
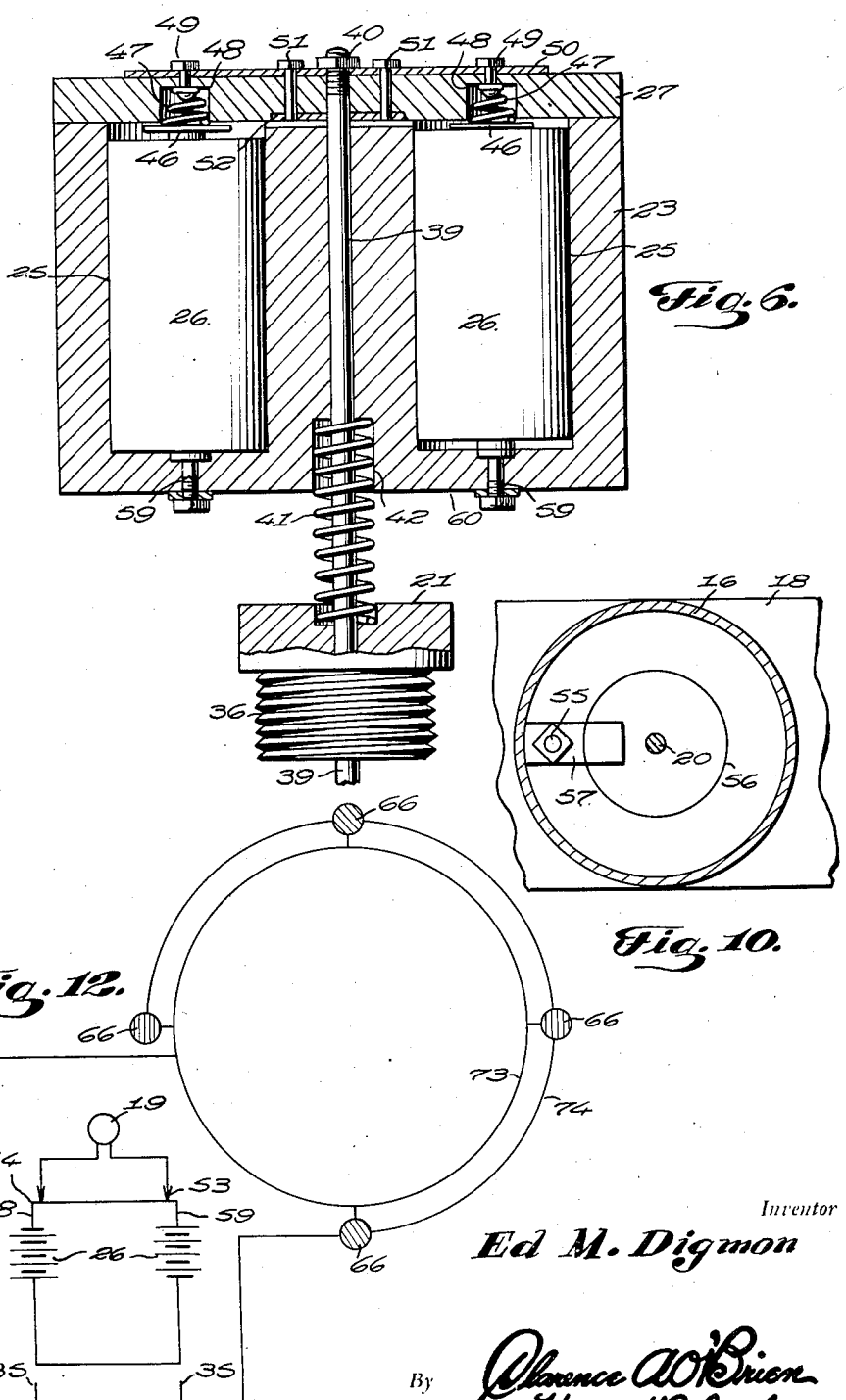
Inventor
Ed M. Digmon
By Clarence A. O'Brien
and Harvey B. Jacobson
Attorneys Patented Aug. 3, 1948

2,446,459

UNITED STATES PATENT OFFICE 2,446,459

DEVICE FOR NIGHT FISHING

Ed M. Digmon, Birmingham, Ala.

Application September 16, 1946, Serial No. 697,336

6 Claims. (Cl. 43—17)

This invention relates to a device for night fishing, and more particularly to a float or bob having means for connection with a fishing line, in the form of a globe designed to float in the water and provided with a pilot light to indicate its location at night time, and signal lights, the pilot light being normally connected in circuit with batteries as a source of electrical current, the circuit to which is normally closed and adapted to be opened when a fish strikes in an attempt to take the bait from the hook of the line, so as to open the circuit to the pilot light so as to extinguish the same and close the circuit to the signal lights to cause the same to be lighted so that the fishermen will be warned or notified of a catch.

Another object of the invention is to provide a device or float for use when fishing at night, the float being designed to contain the batteries and switches normally closing the circuit to a pilot light on top of the float and normally opened to signal lights around the float out of view of the fish, so that when a fish attempts to take the bait and pulls downward on the line, the switch to the pilot light will be opened to extinguish the same and the circuit to the signal lights closed, to indicate when the fish strikes, the float containing a unit removably mounted therein with a guide member having contacts controlling the flow of current to the pilot and signal lights and a battery removable with respect thereto and operated by pull on the line to open the circuit to the pilot light and close the circuit to the signal lights, thereby making it possible for the fisherman to determine when the fish strikes in the dark or at night time.

Another object of the invention is to provide a float which is waterproof, and provided with means for removably or detachably anchoring the electrical unit therein and for obtaining access thereto through an opening in the top, for assembly, for replacement or repair while maintaining a cover over the opening in watertight connection, so that the same will not be fouled by the entry of water when in use.

Another object of the invention is to provide a novel support and guide for movably mounting the batteries as a source of electrical current for supplying the current to a pilot light on the cover of the float and a plurality of signal lights around the float, so that the same will be visible on all sides to allow for shifting of the current of a body of water in the wind or tide.

A further object of the invention is to provide a simple durable construction of device or float having signalling means including a pilot light, and signal lights, which is of simple construction, can be readily assembled or disassembled and which is durable in use.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of a device for night fishing constructed in accordance with the invention;

Figure 2 is a diametrical sectional elevation thereof;

Figure 3 is a horizontal sectional view taken on the line 3—3 of Figure 2;

Figure 4 is a fragmentary enlarged diametrical sectional view taken on the line 4—4 of Figure 1;

Figure 5 is a detailed sectional view taken on the line 5—5 of Figure 1;

Figure 6 is a sectional view taken on the line 6—6 of Figure 3;

Figure 7 is a fragmentary sectional view taken on the line 7—7 of Figure 2;

Figure 8 is a detailed fragmentary sectional view taken on the line 8—8 of Figure 2;

Figure 9 is a detailed fragmentary sectional view taken on the line 9—9 of Figure 2;

Figure 10 is a detailed sectional view taken on the line 10—10 of Figure 4;

Figure 11 is a detailed perspective view of a contact plate for the switch of the signal light, and Figure 12 is a diagrammatic view of the electrical circuit to the lights.

Referring to the drawings in detail, in which like reference characters designate corresponding parts throughout the several views, the device of the present invention is shown as comprising a float 10 in the form of a globe, preferably about 8" in diameter made of light rust resisting metal, plastic, cardboard or other suitable material which will float, the globe being hollow. The top of the globe is provided with a circular opening 11 closed by a cover 12 conforming to the shape of the globe and separated therefrom as the chord of an arc with an interposed packing or gasket of cork, rubber or other suitable material to render the same watertight or waterproof. The cover is provided with a flanged central opening 13 at the top adapted to be closed by a transparent or white shield or cover 14, of plastic, glass or other suitable material secured in position with an interposed gasket or packing and threaded into the wall of the cover with an open inner end projecting into the hollow chamber of the float or globe within the cover 12, the open inner end being provided with a screw threaded metallic shell 15 if desired. The cover is secured in position by attaching the inner end of the shield 15 in a threaded socket 16 anchored centrally as at 17, to an upper cross-bar 18 of insulating material forming part of an electrical unit housed within the hollow globular float. By this means, the pilot light formed by a light bulb 19, within the shield 14 and also anchored to the bar 18 by a bolt or binding post 20 connected to the filament of the light bulb, is removably secured to the cross-bar or support 18 to detachably secure the cover 12 in position whereby to permit insertion of the electrical unit in the assembly of the device as well as to permit disassembly thereof for access to the interior parts, for replacement or repair.

The bar 18 is supported in spaced parallel relation to a lower bar 21 also of insulating material by means of spaced vertical parallel guides 22 in which a battery container 23 is mounted for vertical sliding movement at grooves 24 in the opposed sides thereof. The battery container 23 has two compartments 25 in which suitable batteries, such as dry batteries 26 are mounted and protected by a cover 27.

The upper ends of the guides 22 are suitably anchored to the cross-bar 18 at the ends of the latter through the medium of outwardly projecting angular portions 28 engaging the underside and ends of the bar 18 and bolted therethrough as at 29, to form binding posts or terminals. The lower ends of the guides 22 are directed outwardly as at 30, and anchored to the end portions of the bar 21 as by bolts 31, with interposed contact plates 32 spaced apart at their inner ends, the contact plates having spaced holes 33 similar to the out-turned ends or foot portions 30 of the guides 22 to receive the fastening means 31 and also having raised studs or contact portions 34 on which contact springs 35 are suitably secured. The bar 21 is provided with a central depending threaded shank 36 the external threads of which are screwed into the internal threads of a socket 37 bolted or otherwise secured as indicated at 38 centrally to the bottom of the hollow shell forming the globular float 10, but any other suitable form of detachable connection may be provided for mounting the stationary guides 22 within and upon the bottom of the float 10 at the inside.

The container 23 centrally between the compartments 25 receives therethrough and through the cover 27, a stem 39 having a nut or other detachable securing means 40 at its upper end removably securing the cover 27 in position and extending through aligned bores in the cover and central partition of the container 23 and extending through a coil spring 41 retained in a counter-bore 42 at the lower end of the container and partition and seated in a recess in the top of the bar 21 at the bottom of the guides to normally urge the container 23 upwardly. The stem 39 is sufficiently long to extend through a central opening 43 at the bottom of the globe or float 10 where it is engaged by a turnbuckle or a nut 44 having a swiveled eye 45 at the bottom, for connection to a fishing line to determine the depth of the hooks thereof in the water and adapted to be pulled downwardly in the event of a catch or strike, by the fish to correspondingly lower the container 23 on its guides 22 with the rod or stem 39 against the action of the spring 41 tending to elevate the container which is preferably made of plastic or some light insulating material. The top contacts 46 of the batteries 26 engage contact springs 47 in recesses 48 in the bottom of the cover 27 connected to bolts 49 forming electrical connection with a connecting strip 50 on the cover 27 of the container secured by the fastening nut 40 on the bolt, stem or rod 39 and additional fastening means or bolts 51 also anchoring the connecting conductor strip to the cover 27 in connection with a bottom strip 52 if desired. A switch including a spring contact 53 is attached to the bolt or shank 20 forming a binding post for the bulb 19 beneath the cross-bar 18 and retained by the nut thereof to extend downwardly and outwardly in spaced relation to the bottom face of the bar 18. A circuit spring contact 54 is secured to the socket or shell 16 to attach the latter to the bar 18 by a fastening means such as a bolt 55, the contact 54 being rebent to extend inwardly and downwardly at one end in corresponding spaced relation to the bottom of the bar 18 and completing the circuit to the lamp 19 by connection of the terminal 20 with the filament thereof and of the post 55 with the shell 56 forming the base of the light bulb 19, as at 57. Contact rods 58 extend through the central partition wall of the container 23 and are in the form of bolts, the upper ends of which are designed to engage the spring contacts 53 and 54 under the urgence of the spring 41 to close the circuit to the pilot light or bulb 19 in the normal position of the movable contacts 58 with the container 23 and batteries 26. The lower ends of the batteries 26 normally engage contacts in the form of stems or bolts 59 on the lower headed ends of which are retained angular contact bars or connecting strips 60 having contacts 61 at their opposite ends to engage the spring contacts 35 when downward pull is exerted on the stem 39 by the line connected to the turnbuckle 44 at the eye 45, which latter is swiveled to prevent fouling of the line, hooks and bait. The contacts 61 are formed as the head of the contact rods 58 at the bottom of the container 23.

Arranged around the hollow globe forming the float 10, at equi-distantly spaced points below the cover 12 and opening 11, are a plurality of signal lamps 62, which may be colored for easy vision, such as alternately red and green as shown in Figure 1 and comprising transparent shields or covers secured in rims 63 of corresponding non-rusting metal or otherwise bolted through the wall of the float 10 as indicated at 64 and disposed over openings 65, in said wall in which are mounted light bulbs 66 protected from the water by interposed packings or gaskets between the globes 62 and the rims or frames 63. Threaded supports or shells 65' are retained in position by the bolts 64 and mount insulated plugs or supports 66' having external metallic shells 67 removably mounted or threaded within the shells or sockets 65', the insulated plugs or supports 66' having internally threaded sockets 68 at their outer ends, in which the bases or shells 69 are mounted to form sockets for the bases 70 of the light bulbs 66 with connection made through the frames or rims and sockets 65', with the sockets 69 to the bases 70, and to the filaments of the bulbs 66 through the central contact 71 with a binding post, stem or bolt 72 extending through an axial bore in the plugs 66' to the inside and connected by conductor or strip 73 around the inside or hollow chamber of the float or globe 10 to act as a ground for the circuit, unless the globe is of metal, in which event the bases 70 may be grounded to the metallic shell of the globe or float 10. The light bulbs 66 are connected in series to the shells or sockets 69 by the conductor or strip 73 to the filaments and bases 70 and through the sockets 69 and 65' by a conductor 74 which is in turn connected at its ends to the terminals 29 one of which is connected to the conductor 74 and the other of which is connected to the conductor 73, so that when the container 23 is moved downwardly on the guides 22 by a pull on the line, the contacts 58 are disengaged from the contacts 53 and 54 to open the circuit to the lamp 19 and engage the contacts 61 with the contacts 35 to close the circuit to the signal lamps of the bulbs 66. In this manner, the pilot light 14 at the bulb 19, which is normally lighted to permit the position of the float to be ascertained in the dark or at night time, is extinguished at the bulb 19 and the signal lamps or lights 62 are lighted at the bulbs 66 to indicate when there is a catch or strike, so that attention may be given to the line by the fisherman. Upon pull or tension being released from the line, the contacts 61 will be disengaged from the contacts 35 stationary with the bar 21, and the contacts 61 and 58 moved upwardly with the container 23 on the guides 22 under the urgency of the resilient member or spring 41, to open the circuits to the signal lamps and extinguish the same, while closing the circuit to the pilot lamp or light by engagement of the contacts 58 with the contacts 53 and 54, the circuit in each case being closed from a source of electrical current, namely the batteries 26 to the respective lamps, or opened by disconnection of the movable contacts 58 and 61 with respect to the contacts 53 and 54, and 35 respectively using the same source of current in each instance. However, access to the container may be had by removing the cover 12 of the float 10, for renewing the batteries 26, or for the replacement or repair of the parts, in addition to the original assembly of the electrical unit and the mounting thereof within the globular float or hollow chamber thereof. Of course, it is to be understood that the globular float 10 should float in the water and extend above the same a sufficient height, to constantly expose the signal light bulbs in addition to the pilot light by which the position of the device is ascertained at night.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In a device for night fishing, a globular float having an opening in top thereof, a cover for said opening conforming to the float, a pilot light in the cover, a plurality of signal lights around the float outwardly of the pilot light, a source of electric current within the float, stationary contacts connected to the respective pilot light and signal lights, a movable member having contacts for alternately engaging the contacts of the pilot and signal lights, and means for actuating the movable contacts upon a pull on a fishing line.

2. In a device for night fishing, a globular float having an opening in top thereof, a cover for said opening conforming to the float, a pilot light in the cover, a plurality of signal lights around the float outwardly of the pilot light, a source of electric current within the float, stationary contacts connected to the respective pilot light and signal lights, a movable member having contacts for alternately engaging the contacts of the pilot and signal lights, and a stem depending through and below the float and connected to the movable contacts and having means for connecting a fish line thereto at its portion extending into the water, for supporting hooks and bait, to exert downward pull thereon upon a strike or catch, to actuate said movable contacts.

3. In a device for night fishing, a globular float having an opening in top thereof, a cover for said opening conforming to the float, a pilot light in the cover, a plurality of signal lights around the float outwardly of the pilot light, a source of electric current within the float, stationary contacts connected to the respective pilot light and signal lights, a movable member having contacts for alternately engaging the contacts of the pilot and signal lights, and means for actuating the movable contacts upon a pull on a fishing line, said movable contacts being normally resiliently actuated to close the circuit to the pilot light and open the circuit to the signal lights.

4. In a device for night fishing, a globular float having an opening in top thereof, a cover for said opening conforming to the float, a pilot light in the cover, a plurality of signal lights around the float outwardly of the pilot light, a source of electric current within the float, stationary contacts connected to the respective pilot light and signal lights, a movable member having contacts for alternately engaging the contacts of the pilot and signal lights, a stem depending through and below the float and connected to the movable contacts and having means for connecting a fish line thereto at its portion extending into the water, for supporting hooks and bait, to exert downward pull thereon upon a strike or catch, to actuate said movable contacts, and resilient means normally urging the movable contacts into engagement of the contacts for the pilot light and adapted to disengage therefrom for engaging the contacts of the signal lights upon the pull on the line.

5. A device for fishing at night, comprising a globular float having an opening in the top, a cover for said opening, an electrical unit detachably mounted in the float, guide members fixedly mounted within the float, a movable contact member arranged to move on said guide members and including a battery container, a pilot light having a protecting shield at the top of the cover, signal lights having protecting shields around the opening of the float, stationary contacts carried by the guide members and connected to the respective pilot light and signal lights, and means connected to the movable contacts for connection with a fish line, for actuating the same upon a pull on the line.

6. A device for fishing at night, comprising a globular float having an opening in the top, a cover for said opening, an electrical unit detachably mounted in the float, guide members fixedly mounted within the float, a movable contact member arranged to move on said guide members and including a battery container, a pilot light having a protecting shield at the top of the cover, signal lights having protecting shields around the opening of the float, stationary contacts carried by the guide members and connected to the respective pilot light and signal lights, a stem connected to the movable member and depending through the bottom of the float, means urging said contacts upwardly, and means for connection of a line to said stem whereby downward pull thereon will separate the contacts to the pilot light and close the contacts to the signal lights.

ED M. DIGMON.

REFERENCES CITED

The following references are of record in the file of this patent:

UNITED STATES PATENTS

| Number | Name | Date |
|---|---|---|
| 1,669,055 | Hogg | May 8, 1928 |
| 1,737,921 | Derr | Dec. 3, 1929 |

FOREIGN PATENTS

| Number | Country | Date |
|---|---|---|
| 46,173 | Sweden | Dec. 6, 1919 |